(12) United States Patent
Cornew

(10) Patent No.: US 12,365,226 B2
(45) Date of Patent: Jul. 22, 2025

(54) VEHICLE COVERING APPARATUS

(71) Applicant: Daniel Cornew, Portola Valley, CA (US)

(72) Inventor: Daniel Cornew, Portola Valley, CA (US)

( * ) Notice: Subject to any disclaimer, the term of this patent is extended or adjusted under 35 U.S.C. 154(b) by 760 days.

(21) Appl. No.: 17/486,374

(22) Filed: Sep. 27, 2021

(65) Prior Publication Data

US 2022/0111714 A1 Apr. 14, 2022

Related U.S. Application Data

(60) Continuation of application No. 16/148,672, filed on Oct. 1, 2018, now Pat. No. 11,130,395, which is a division of application No. 14/846,575, filed on Sep. 4, 2015, now Pat. No. 10,086,685, which is a division of application No. 13/590,036, filed on Aug. 20, 2012, now Pat. No. 9,127,476.

(51) Int. Cl.
| | | |
|---|---|---|
| B60J 11/04 | (2006.01) | |
| E04H 6/02 | (2006.01) | |
| E04H 15/28 | (2006.01) | |
| E04H 15/48 | (2006.01) | |
| E04H 15/54 | (2006.01) | |
| E04H 6/04 | (2006.01) | |

(52) U.S. Cl.
CPC .............. *B60J 11/04* (2013.01); *E04H 6/025* (2013.01); *E04H 15/28* (2013.01); *E04H 15/48* (2013.01); *E04H 15/54* (2013.01); *E04H 6/04* (2013.01)

(58) Field of Classification Search
CPC ... B60J 11/04; E04H 6/02; E04H 6/04; E04H 16/025
USPC ....................................... 150/166; 135/88.01
See application file for complete search history.

(56) References Cited

U.S. PATENT DOCUMENTS

| | | | | |
|---|---|---|---|---|
| 2,716,433 A | * | 8/1955 | Rawlings | B60J 11/00 150/166 |
| 2,994,356 A | * | 8/1961 | Fleming | B60J 11/00 293/1 |
| 5,167,267 A | * | 12/1992 | McQuaid | B60J 11/00 150/154 |
| 5,269,332 A | * | 12/1993 | Osborne | E04H 15/04 114/361 |
| 5,479,787 A | * | 1/1996 | Carter | F24F 1/00 454/236 |
| 5,850,843 A | * | 12/1998 | Mahood | A45B 23/00 135/88.06 |
| 5,927,793 A | * | 7/1999 | McGrath, Jr. | B60J 11/00 160/370.21 |
| 6,276,381 B1 | * | 8/2001 | O'Brien | B60J 11/02 296/136.03 |
| 2009/0102230 A1 | * | 4/2009 | Pehrson | B60J 11/08 296/136.13 |

* cited by examiner

*Primary Examiner* — Sue A Weaver

(57) ABSTRACT

The embodiments provide a vehicle covering apparatus and a vehicle cover. The vehicle covering apparatus includes a base, an upright member, an arm, an extension rod a coupler assembly and support line.

4 Claims, 10 Drawing Sheets

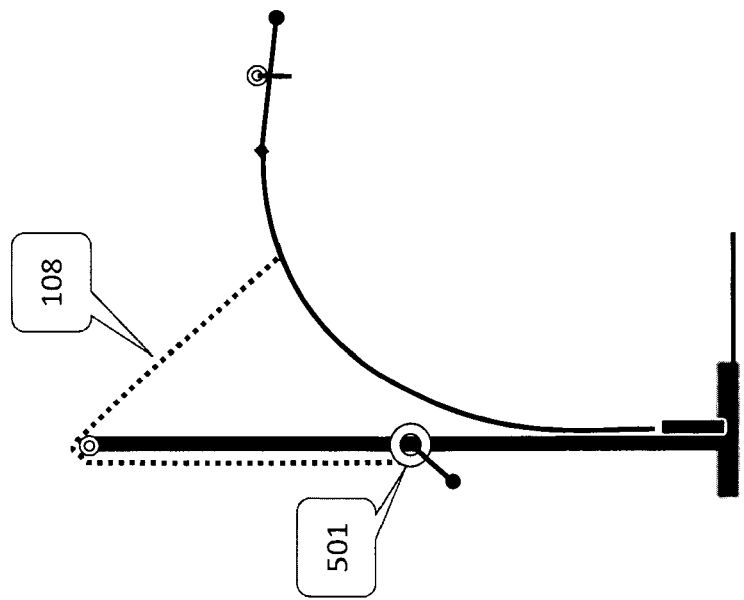

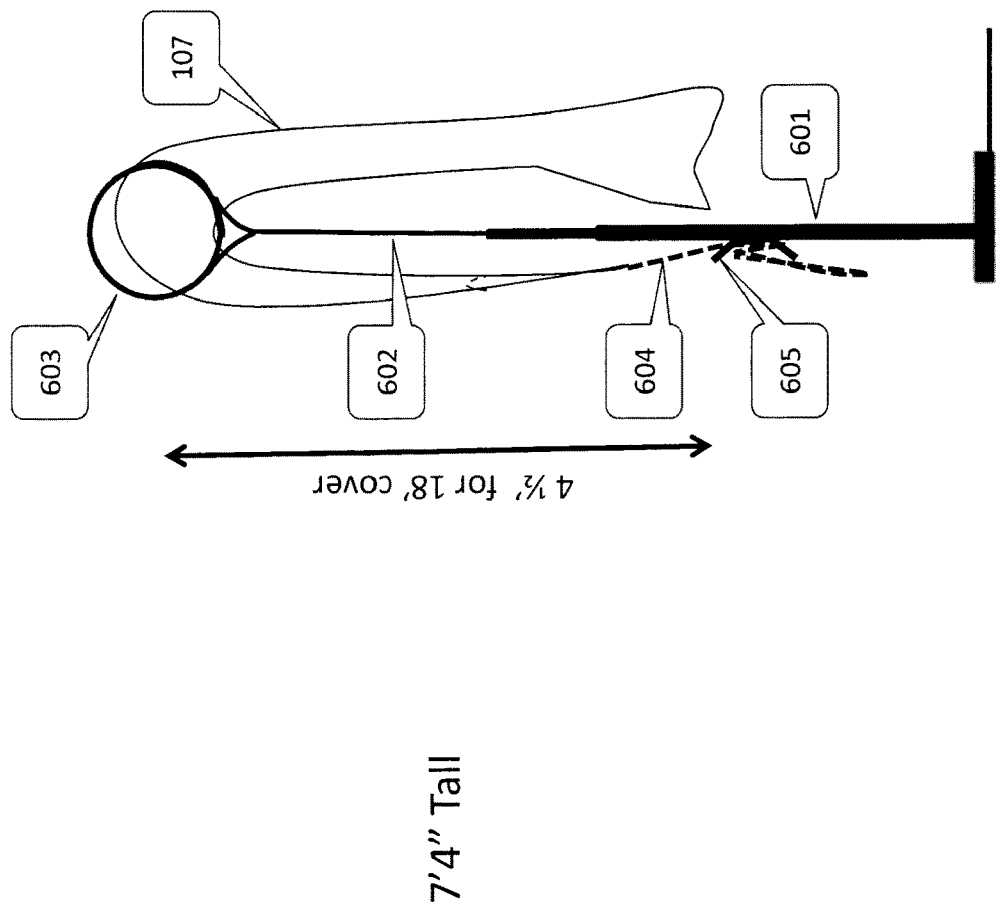

VEHICLE COVERING APPARATUS

BACKGROUND

Vehicles are often parked and/or stored outside. Left unprotected and exposed to the weather and other outdoors conditions the interior of a vehicle may age prematurely and the exterior finish may be damaged. Vehicle owners want to protect their vehicles from the direct sun light, inclement weather and/or the air borne contamination they may be exposed to while parked and/or stored outside.

Vehicle covers are available to protect a vehicle from these natural elements. Generally these covers are difficult to deploy and/or remove. Such covers may be inconvenient, complicated, or difficult for one person to apply, and take too much effort to deploy. When not covering a vehicle, a vehicle cover is typically stored. A vehicle cover is a sizable item to store and the storage method and location are problematic. These characteristics tend to cause vehicle owners that own a cover not to use the vehicle cover.

It is within this context that the embodiments arise.

SUMMARY

The present disclosure provides a vehicle covering apparatus and a vehicle cover. The present disclosure provides a vehicle covering apparatus having a base, an upright member, an arm, an extension rod, a coupler assembly and support line. In another embodiment, a vehicle covering apparatus that includes a base, a, foldable upright member, a foldable arm, a loop support, a support line and a cover securing device is provided. In another embodiment, the vehicle cover includes a patch, a connector, and pockets.

The present disclosure further provides a vehicle covering apparatus comprising a base, an upright member coupled to the base. The apparatus includes an arm having a first end and a second end with the first end of the arm coupled to the base. An extension rod having a first end and a second end is included with the first end of the extension rod forming a stop and the first end of the extension rod coupled to the second end of the arm. A coupler assembly is provided having a first end and a second end with the first end of the coupler assembly movably mounted on the extension rod and the second end of the coupler assembly configured to be affixed to a cover. A support line is coupled to the arm through a force adjusting device, where the support line is configured to position the cover between a first position and a second position. The apparatus includes a cover securing device configured to secure the cover to the upright member when the cover is in the first position. In some embodiments, the base is configured to indicate a vehicle location for deploying the cover. In some embodiments, the base includes parallel raised surfaces extending outward from the periphery of the base. In some embodiments, the upright member is adjustable. In some embodiments, the upright member is rotatably coupled to the base. In some embodiments, the arm is coupled to the base through the upright member. In some embodiments, the angle of the arm relative to the upright member is adjustable and the length of the arm is adjustable. In some embodiments, the vehicle covering apparatus further comprises a crank assembly for actuating the support line. In some embodiments the vehicle cover securing device is coupled to the vehicle cover and configured to secure the vehicle cover to the upright member in the first position.

The present disclosure provides a vehicle covering apparatus including a base, a foldable upright member coupled to the base, and a foldable arm having a first end and a second end. The first end of the foldable arm is pivotably coupled to the foldable upright member. The apparatus includes a loop support coupled to the second end of the foldable arm. The apparatus includes a support line configured to be coupled to a cover, wherein the support line is coupled to the cover through the loop support. The support line is operable to position the cover between a first position and a second position. The apparatus includes a cover securing device configured to secure the cover to the foldable upright member when the cover is in the first position. In some embodiments, the foldable upright member and the foldable arm are hinged. In some embodiments, the base is configured to indicate a vehicle location for deploying the cover. In some embodiments, the base includes parallel raised surfaces extending outward from the periphery of the base. In some embodiments, the upright member is rotatably coupled to the base. In some embodiments, the arm is coupled to the base through the upright member.

The present disclosure further provides a vehicle cover including a patch coupled to the center region of the cover, a connector having a first end coupled to the patch, and a second end configured to attach to an apparatus coupler assembly. The cover includes a first pocket extending from a first side of the cover and a second pocket extending from a second side of the cover. The first pocket and the second pocket are operable to accommodate a feature extending from a vehicle to be covered. The first pocket and the second pocket include visual markings, where the visual marking for the first pocket is different than the visual marking for the second pocket. In some embodiments the vehicle cover further comprises a first hook having a visual marking matching the visual marking for the first pocket, where the first hook is affixed to an edge of the vehicle cover adjacent to a side of the vehicle cover having the first pocket and a second hook having a visual marking matching the visual marking for the second pocket, where the second hook is affixed to an edge of the vehicle cover adjacent to a side of the vehicle cover having the second pocket. In some embodiments a first cover securing device is disposed along a bottom edge of the vehicle cover, where the first cover securing device operable to resist lifting of the vehicle cover when the vehicle cover is in the second position.

Other aspects of the invention will become apparent from the following detailed description, taken in conjunction with the accompanying drawings, illustrating by way of example the principles of the invention.

BRIEF DESCRIPTION OF THE DRAWINGS

The embodiments may best be understood by reference to the following description taken in conjunction with the accompanying drawings.

FIG. 5 illustrates an embodiment of a vehicle covering apparatus with the support line configured to be controlled by a crank assembly.

FIG. 6A illustrates an embodiment of a vehicle covering apparatus suitable for use in locations where height may be limited. The illustrated embodiment is in the first or stored position.

DETAILED DESCRIPTION

The figures below illustrate a vehicle covering apparatus with embodiments of an automobile covering apparatus. It is understood that the embodiments can be used with any vehicles including but not limited to cars, trucks, sport utility vehicles, and motorcycles. In addition, the embodiments may be extended to any non-vehicle device that can be covered, such as furniture, grills, etc. It will be obvious, however, to one skilled in the art, that the present invention may be practiced without some or all of these specific details. In other instances, well-known operations have not been described in detail in order not to unnecessarily obscure the present embodiments.

In accordance with the present disclosure, a vehicle covering apparatus enables an owner to quickly, and easily, deploy, remove, and store a vehicle cover. The vehicle covering apparatus has a base which is attached to an upright member. The upright member supports an attached arm coupled to an extension rod. The arm and extension rod support and guide a cover during use. The extension rod provides a location for a coupler assembly to be movably mounted. The coupler assembly is affixed to a vehicle cover and during placement of a vehicle cover on a vehicle the coupler assembly can move along the extension rod for proper cover placement. The movement of the arm and the vehicle cover are controlled using a support line, which is coupled to the arm through a force adjusting device, e.g., a pulley. An operator, by adjusting the support line, can quickly and easily cause the arm and vehicle cover to move between a stored position with the vehicle cover hanging from its approximate center and a deployed or in use position over the vehicle. When the vehicle cover is not deployed or in use the apparatus provides a place for the vehicle cover to be stored and secured to the upright member conveniently. In some embodiments the apparatus is collapsible so that the apparatus and cover may fold to minimize the storage footprint.

Figure 1:
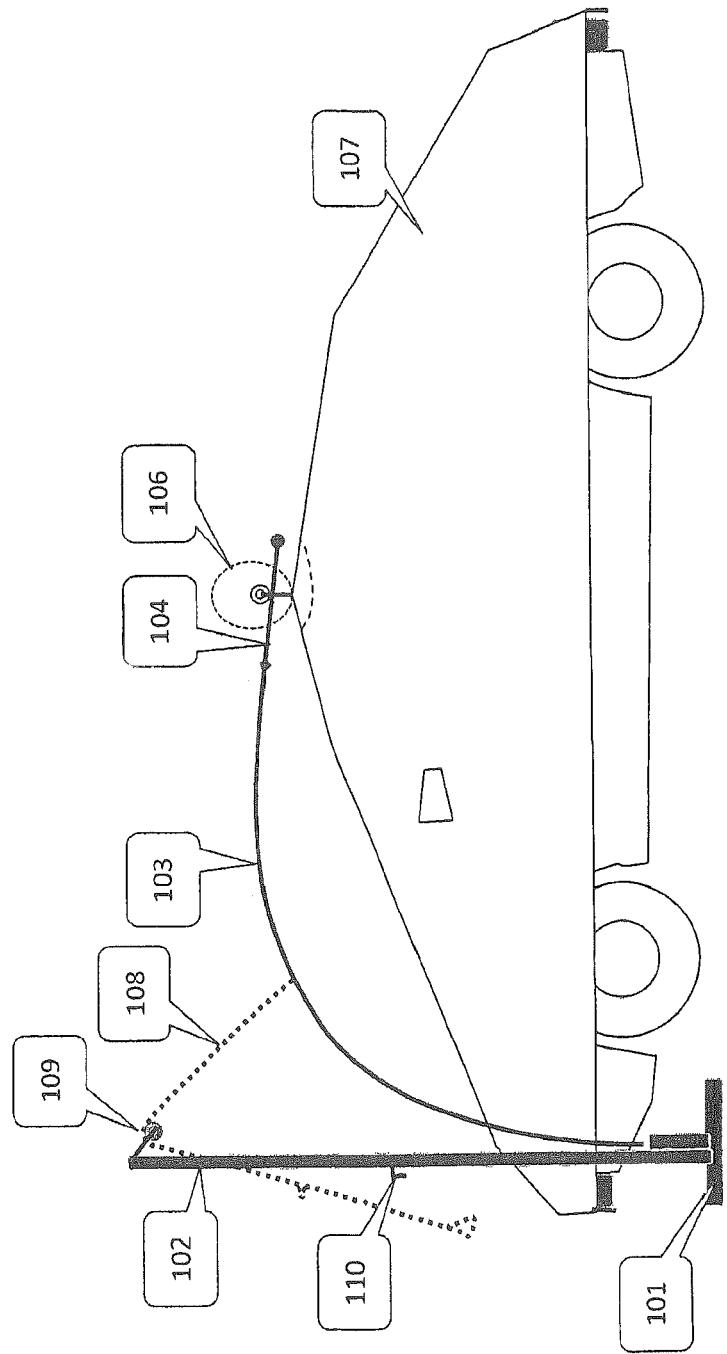
FIG. 1 illustrates a side view of an embodiment of a vehicle covering apparatus with the cover in the second position, covering a vehicle.

FIG. 1 illustrates a side view of a vehicle covering apparatus with the vehicle cover in the second position, covering a vehicle in accordance with one embodiment. Base 101 is of dimensions and mass sufficient to support the apparatus and a vehicle cover during use in all positions. The base 101 can be made from a variety of materials including but not limited to concrete, metal, or plastic. The base 101 may be of a solid construction or a hollow construction which can be filled with material, such as water or sand. Base 101 is coupled to upright member 102. The upright member 102 is coupled to the base perpendicular to the upper surface of the base 101 in one embodiment. The upright member 102 may be a solid monolithic piece or of tubular construction having foldable sections. An embodiment may include an upright member 102 which is adjustable in length from the base surface, and/or angle in relation to the base surface. An upright member 102 having telescoping components is one such adjustable length embodiment. An upright member 102 including a hinged member is one such adjustable angle embodiment. The upright member 102 also may be rotatably coupled to the base in some embodiments. The upright member 102 provides a location for storing a vehicle cover 107 when not in use and a location for attaching a vehicle cover securing device 110 to secure the vehicle cover when not in use. The upright member also provides a location for securing a force adjusting device 109. The force adjusting device 109 could be, but is not limited to, a pulley. The upright member 102 is long enough to provide sufficient height of the apparatus for the deployment of a vehicle cover 107 and the storage of a vehicle cover when the vehicle cover is not in use. A sufficient height of the apparatus for the deployment of a vehicle cover 107 facilitates the movement of a vehicle cover from the stored position, a first position, to a position over the vehicle, a second position, for placement or deployment of a vehicle cover over a vehicle or other apparatus. A sufficient height of the apparatus for the storage of a vehicle cover 107 when not in use in the first position is a height to accommodate the vehicle cover with the vehicle cover kept an acceptable distance off the ground or off an indoor floor surface in some embodiments. The embodiment depicted in FIG. 4 illustrates an arm length and sufficient apparatus height exceeding approximately one half of the vehicle cover length because the apparatus lifts the vehicle cover in the approximate center of the vehicle cover resulting in a hanging or stored length approximately one half the vehicle cover length. The embodiment depicted in FIG. 6A illustrates an arm length and sufficient apparatus height exceeding approximately one fourth of the vehicle cover length because the vehicle cover is stored in the first position draped or hanging through the support loop 603.

Referring back to FIG. 1, coupled to the base 101 is an arm 103 having a first and second end with the first end coupled to the base 101. The arm 103 can be flexible or rigid. FIG. 1 depicts a flexible embodiment. The arm 103 can be made from a variety of materials including but not limited to metal, plastic, fiberglass, wood and/or composite materials similar to those used in the manufacture of fishing rods. The arm 103 supports the movement of a vehicle cover 107 between a stored position, position 1 and a deployed position, position 2, as illustrated in FIG. 4. In the deployed position the vehicle cover 107 is covering a vehicle as depicted in FIG. 1, although the apparatus may be utilized to cover other items besides vehicles. The first end of the arm 103 is coupled to the base 101 through the upright member 102 in some embodiments. FIG. 1 illustrates the arm 103 directly coupled to the base 101 in this embodiment. The arm 103 supports and guides the hanging storage, movement, and placement of the vehicle cover 107. The arm 103 is moved from an upright position when a vehicle cover 107 is stored to a position over a vehicle for the placement and support of the vehicle cover during deployment. The second end of the arm 103 is coupled to the first end of an extension rod 104. The extension rod 104 is rigid in some embodiments. The extension rod 104 may be tubular or solid. The extension rod's outer surface is configured to accommodate the movement of a coupler assembly 106 along the length of the extension rod 104. A more detailed description of the configuration of the outer surface of the extension rod 104 and the mating surface of the first end of the coupler assembly 106 follows in the description of FIG. 2A.

Returning to FIG. 1, the first end of the extension rod 104 forms a stop which prevents the travel of the coupler assembly 106 along the arm 103. The second end of the extension rod 104 may form a stop which prevents the travel of the coupler assembly 106 off the second end of the extension rod 104. The stops may be any suitable element preventing movement of extension rod 104 past the stop. A coupler assembly 106 having a first end and a second end is movably mounted on the extension rod 104. The first end of the coupler assembly 106 is movably mounted on the extension rod 104. The second end is configured to be affixed to a vehicle cover 107. The movement of the coupler assembly 106 along the length of the extension rod 104 provides the needed flexibility in the placement and location of the vehicle cover 107 in relation to a vehicle. The movement of the arm 103 and coupler assembly 106 along extension rod 104 is controlled by a support line 108 in some embodiments. The support line 108 is coupled to the arm 103 through the force adjusting device 109 and is configured to position or to move the vehicle cover 107 between the first position, the stored position secured to the upright member 102 and the second position, the deployed position covering a vehicle. The support line can be but is not limited to a rope, cord, cable, or wire. From the first position an operator can increase the available length of the support line 108 or let out the support line allowing the arm and vehicle cover to be moved into the second position covering a vehicle 107. An operator can then decrease the available length of support line 108 or take in the support line 108, remove the vehicle cover from the vehicle and move the vehicle cover back to the first position for storage.

Figure 2A:
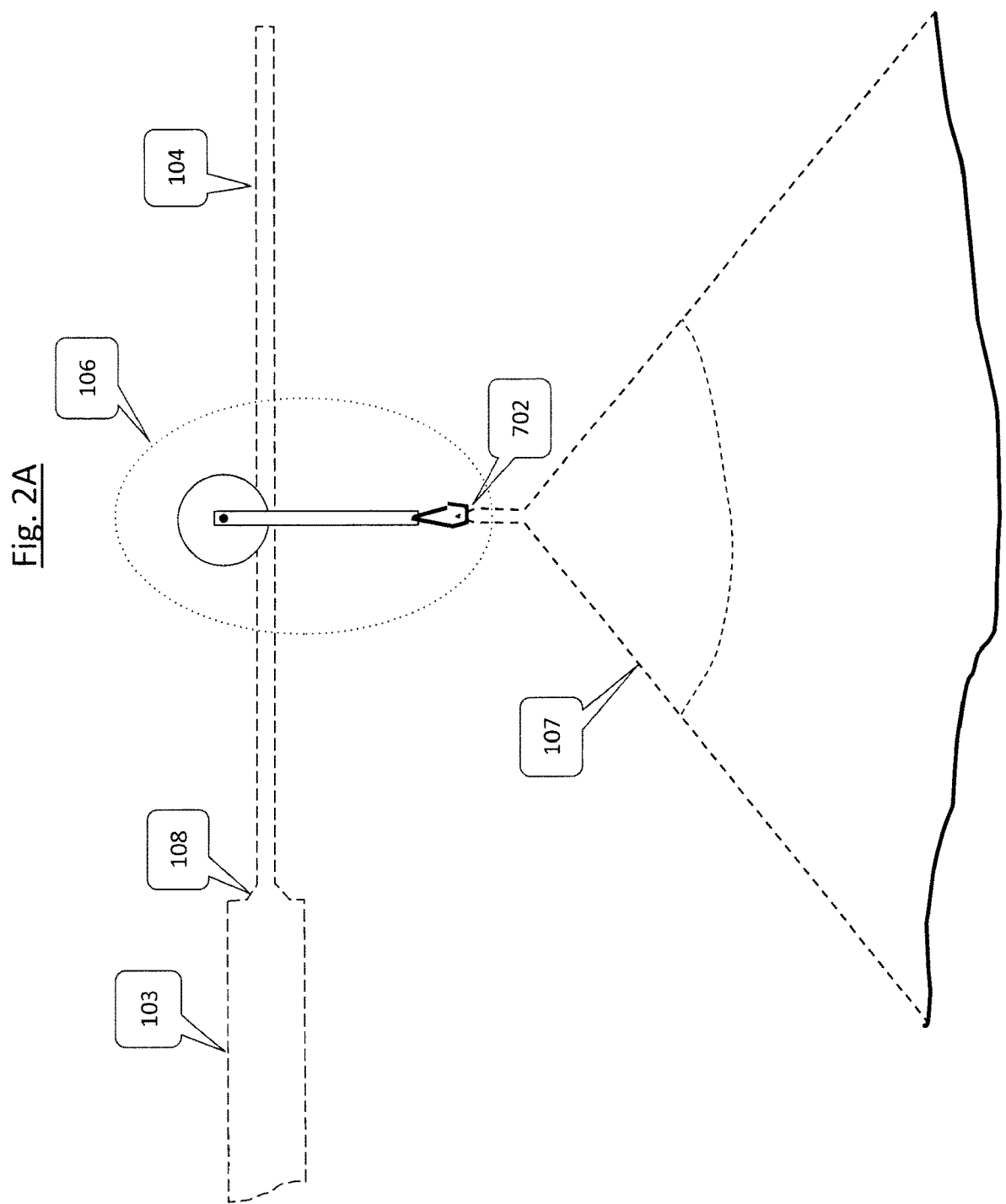
FIG. 2A illustrates a side view of an embodiment of a coupler assembly movably mounted on an extension rod.

FIG. 2A illustrates a side view of a coupler assembly 106 movably mounted on an extension rod 104 in accordance with one embodiment. The coupler assembly moves along the length of the extension rod 104 which has a first and second end. The first end of the extension rod is connected to the arm 103. The first end of the extension rod 104 is formed to create a stop 108 which prevents the coupler assembly from moving on to the arm 103. The second end of the extension rod 104 may also form a stop which prevents the travel of the coupler assembly 106 off the second end of the extension rod 104. The illustrated embodiment depicts the first end of the coupler assembly 106 to be a wheel. The surface of the extension rod 104 and the mating surface of the first end of the coupler assembly may each be contoured to receive each other like a pulley wheel outside diameter may be contoured to receive a round rope or cable thereby increasing the ease of movement of the coupler assembly 106 along the length of the extension rod 104. It should be appreciated that additional embodiments could include coupler assemblies with first ends configured as sleeves or bushings capable of sliding along the extension rod 104. It should be appreciated that in some embodiments this could be accomplished without the rod, e.g., with extra rope. In this embodiment, the attachment point on the cover not be fixed in location relative the apparatus hence allowing for a degree of flexibility for the location of the vehicle to be covered relative the apparatus The second end of the coupler assembly is configured to be affixed to a vehicle cover 107. FIG. 2A illustrates an embodiment including a hooked fastener with a spring release similar to the clips found in the manufacture of key chains and pet leashes. The desired feature of the second end of the coupler assembly is to provide a reliable, easily operated means for affixing a vehicle cover to the apparatus, preferably requiring only the use of one hand to operate the second end of the coupler assembly 106 in some embodiments. FIG. 2A illustrates a vehicle cover connector 702 connected to the hooked fastener. In this embodiment the vehicle cover connector 702 may be similar to a hooked fastener illustrated in the second end of the coupler assembly 106. The vehicle cover connector 702 provides a reliable, easily operated means for affixing a vehicle cover to the apparatus, preferably requiring only the use of one hand to operate. It should be appreciated that with the use of two hands an operator can connect a vehicle cover connector 702 to the hooked fastener on the second end of the coupler assembly 106. As mentioned above, the movement of the coupler assembly 106 along the length of the extension rod 104 provides the flexibility in the placement and location of the vehicle cover 107 in relation to a vehicle. As the vehicle cover 107 is applied to the vehicle the coupler assembly 106 is free to move along the extension rod above the center of the vehicle in some embodiments.

Figure 2B:
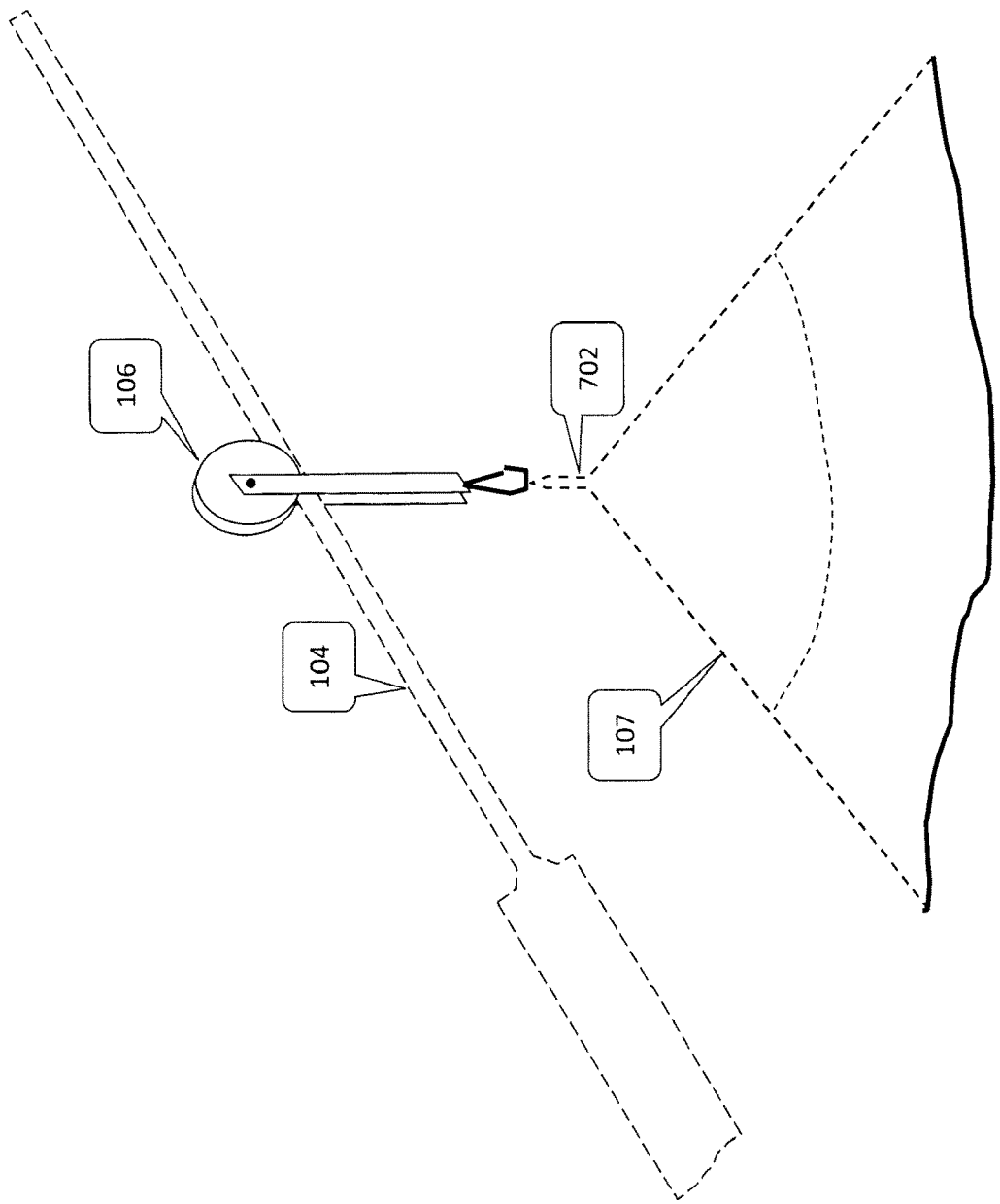
FIG. 2B illustrates an isometric projection view of an embodiment of a coupler assembly movably mounted on an extension rod.

FIG. 2B illustrates an isometric projection view of a coupler assembly movably mounted on an extension rod 104. The illustrated embodiment depicts the first end of the coupler assembly 106 configured to be a wheel with an inside diameter surface profiled to accommodate the outside diameter of the extension rod 104. In this embodiment, the wheel is concavely reduced with a radius slightly larger than the radius of the extension rod 104 to maximize the ease of movement of the coupler assembly 106 along the length of the extension rod 104.

Figure 3A:
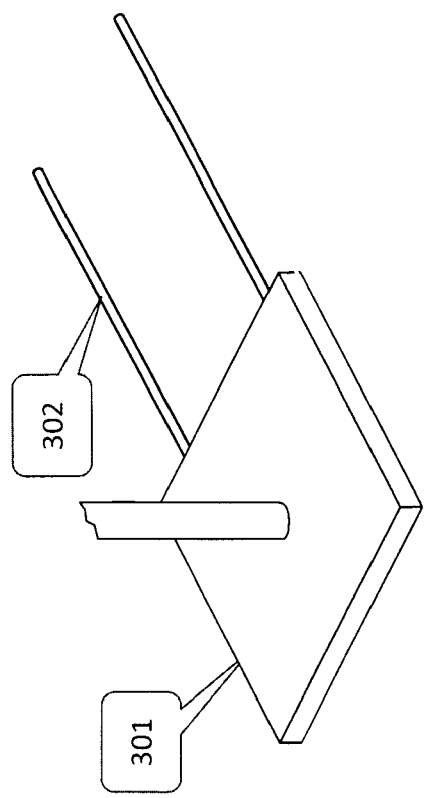
FIG. 3A illustrates an embodiment of a base with parallel raised surfaces extending from the periphery of the base.

FIG. 3A illustrates a base 301 which is configured to include parallel raised surfaces 302 extending outward from the periphery of the base 301. The materials the raised surfaces 302 can be made from include but are not limited to metal, plastic and any material which can withstand regular vehicle traffic. The profile of the parallel raised surfaces 302 can be but is not limited to round rods, channel, angle, formed tubing or bar. The space separating the parallel raised surfaces is approximately the length of a tire print of a parked vehicle. The parallel raised surfaces 302 are long enough to extend under the driver's side front wheel in some embodiments. The driver can drive the vehicle onto and in between the parallel raised surfaces and upon sensing the discernible stop for the tire, stop the vehicle in the proper location for use of the vehicle covering apparatus and deployment of the vehicle cover.

Figure 3B:
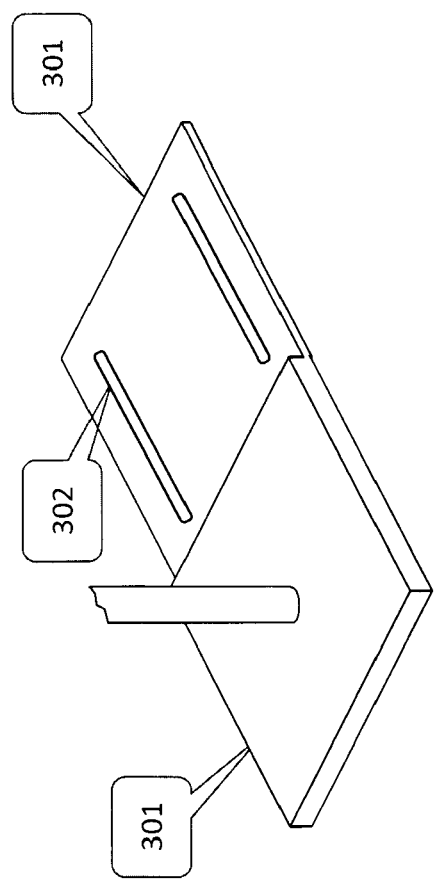
FIG. 3B illustrates an embodiment of a base with parallel raised surfaces on the surface of the base.

FIG. 3B illustrates an embodiment with the parallel raised surfaces 302 on the surface of the base 301. The base 301 and parallel raised surfaces 302 enhance the driver's ability to sense the vehicle's proper location on the base 301 by providing discernible stops for the tire. It should be appreciated that an embodiment with only a base 301 which extends under the vehicle tire and has no parallel raised surfaces 302 also offers some sensory notice of the proper place to stop a vehicle to use the apparatus. It should be appreciated that a base 301 as depicted FIG. 3B extending under the vehicle tire also offers additional anchoring of the apparatus while the vehicle is parked on the base 301. It should be appreciated that the park assist feature of the base is an optional feature.

Figure 4B:
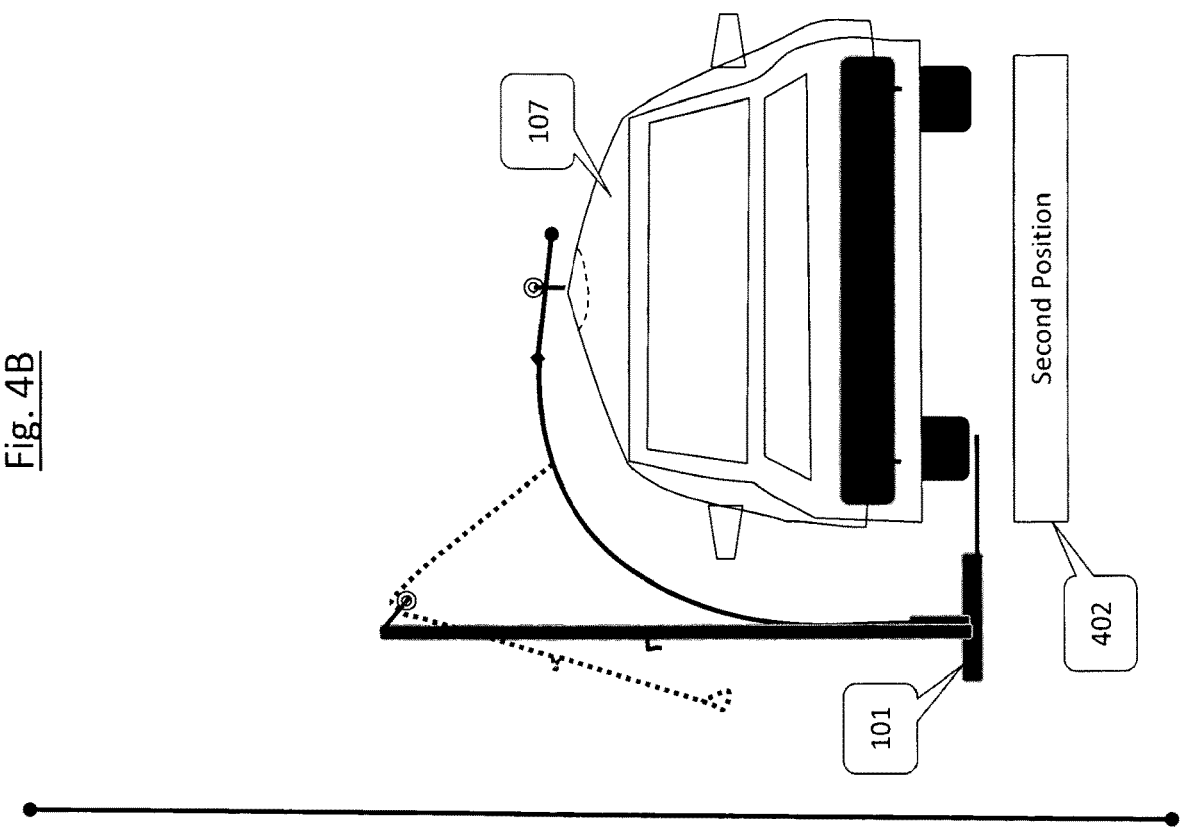
FIGS. 4A and 4B illustrate an embodiment of a vehicle covering apparatus in a first position, the stored position and in a second position with the cover deployed.
Figure 4A:
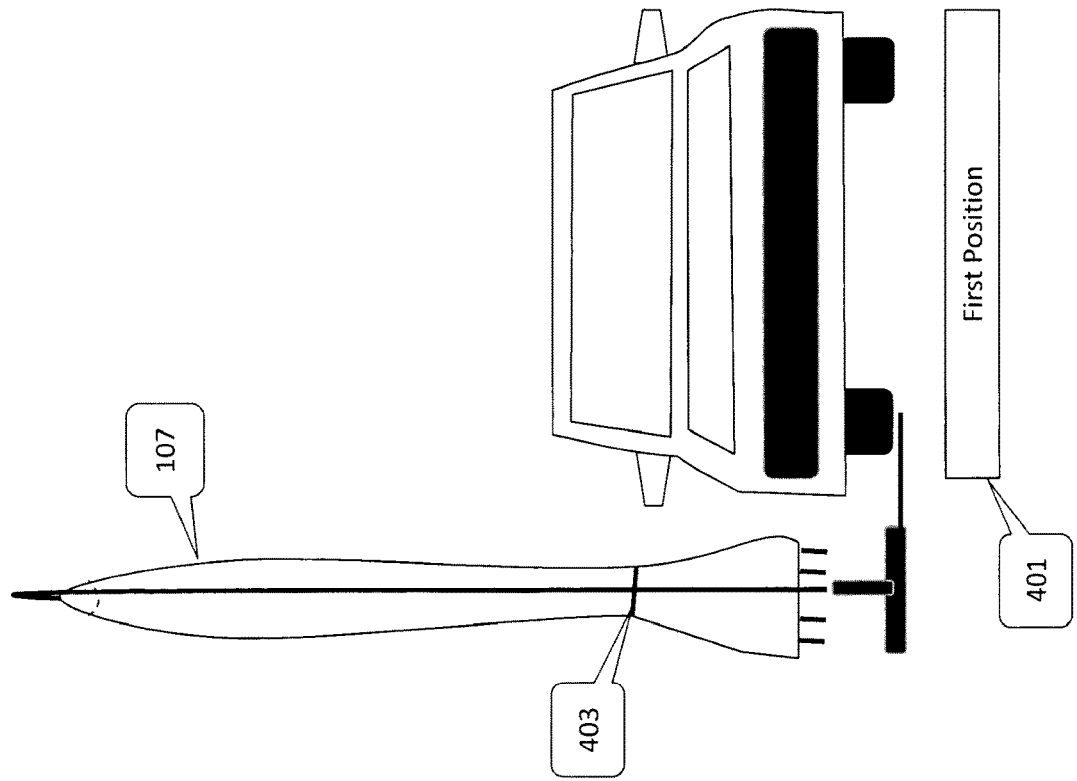

FIG. 4A illustrates the vehicle covering apparatus in first position, the stored position 401. In this position the arm and extension rod are in a vertical or upright position and the vehicle cover 107 is secured to the upright member by the vehicle cover securing device 403. The vehicle cover securing device 403 could include but not be limited to a strap like an umbrella securing strap made of similar material as the vehicle cover 107, a hook similar to a curtain hook or a rope, etc. FIG. 4B illustrates the vehicle covering apparatus in second position, with the vehicle cover 107 deployed in the second position 402. It should be appreciated that base 101 of FIG. 4B is illustrated as detailed in FIG. 1, while the base of FIG. 4A is illustrated as detailed in FIGS. 3A and 3B.

FIG. 5 illustrates an embodiment with the support line 108 configured to be controlled by a crank assembly 501. The crank assembly depicted is a manual crank in this embodiment. The crank assembly 501 is meant to be an example and not meant to be a limiting feature as the crank assembly may be any commercially available assembly, or an automated crank assembly in other embodiments. Further examples of alternative embodiments could include but not be limited to alternative methods of adjusting the support line 108 including a reel like device similar to a fishing reel, a window blind adjustment device, a patio umbrella crank with an automatic stopping feature or a nautical cleat securing the support line 108 at desired lengths or a rope that is pulled directly and hooked at a point on the apparatus.

Figure 6B:
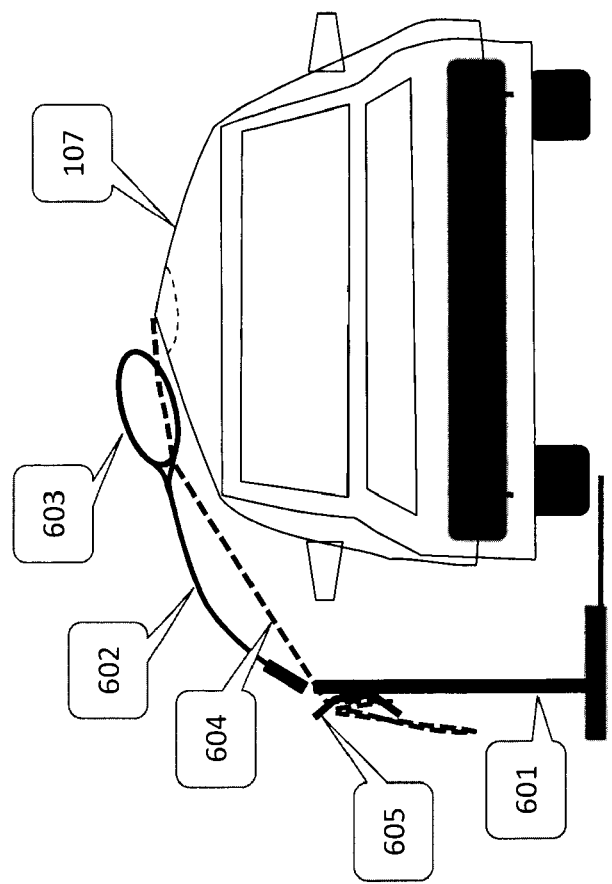
FIG. 6B illustrates an embodiment of a vehicle covering apparatus suitable for use in locations where height may be limited. The illustrated embodiment is in the second or deployed position.

FIG. 6A and FIG. 6B illustrate an embodiment of a vehicle covering apparatus suitable for use in locations where height may be limited. An indoor storage environment in one such location. This embodiment utilizes a foldable upright member 601 which is coupled to a base. The foldable upright member 601 may be solid or tubular construction and made from materials including but not limited to a metal or plastic. The opposing end of the foldable upright member 601 is coupled to the first end of a foldable arm 602. The foldable arm 602 may be of construction and materials similar to those of the foldable upright member 601. The first end of the foldable arm is pivotably coupled to the foldable upright member 601. This coupling could be a hinge in one embodiment. Additional embodiments could include but not be limited to the coupling being a ball and socket joint. The second end of the foldable arm 602 is coupled to a loop support 603. The loop support 603 can be constructed of metal or plastic and have a diameter sufficient for passing a vehicle cover 107 through the support loop 603 for deployment and storage. The support loop surfaces are smooth, continuous and the shape of the support loop is regular in radius to minimize the risk of the support line 108, and or the vehicle cover 107 from snagging on the support loop 603 during movement of the vehicle cover 107 between first and second positions. A support line 604 is configured to be coupled to the vehicle cover 107 through the loop support 603. The support line 604 is operable to position the vehicle cover between a first position when the vehicle cover 107 is secured by a vehicle cover securing device 605 as illustrated in FIG. 6A and a second position with the vehicle cover 107 covering a vehicle as illustrated in FIG. 6B. From the second position, by adjusting the support line 604, the foldable arm 602 and the loop support 603 can be moved to a vertical position while drawing the vehicle cover through the support loop 603 causing the vehicle cover to drape over the support loop 603 in a compact form for storage. To deploy the vehicle cover 107 from the stored first position the support line 604 is loosened so that the foldable arm 602 and the loop support 603 move toward the vehicle causing the vehicle cover 107 to pass through the support loop 603 and be in position to cover the vehicle. This embodiment is suitable for use indoors or where height may be limited because the use of the support loop 603 results in the vehicle cover 107 being draped through the support loop creating a stored vehicle cover length of approximately 25% of the overall length of the vehicle cover 107. The shorter hanging stored length makes a shorter apparatus possible. Storing the vehicle cover in this manner eliminates the usual inconvenience of unfolding and folding or unrolling and rolling a vehicle cover before and after every use. The apparatus also stores the vehicle cover 107 in the immediate vicinity of its use. It should be appreciated that the embodiments enable deployment, removal and storage of the vehicle cover is rapid and simple.

Figure 7C:
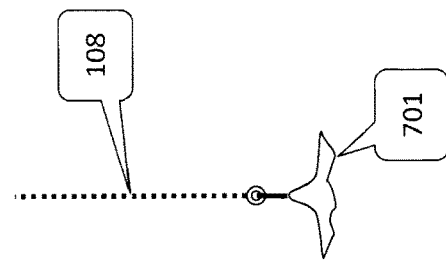
FIG. 7A-C illustrate a top view of a vehicle cover in the second or deployed position and example coupling of a patch and the vehicle cover in some embodiments.
Figure 7B:
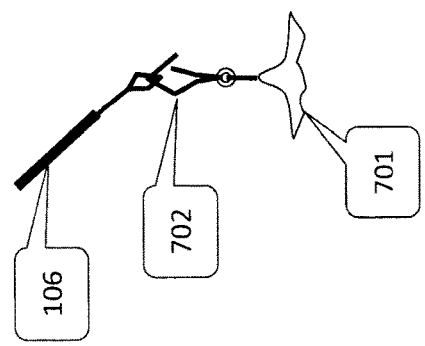
Figure 7A:
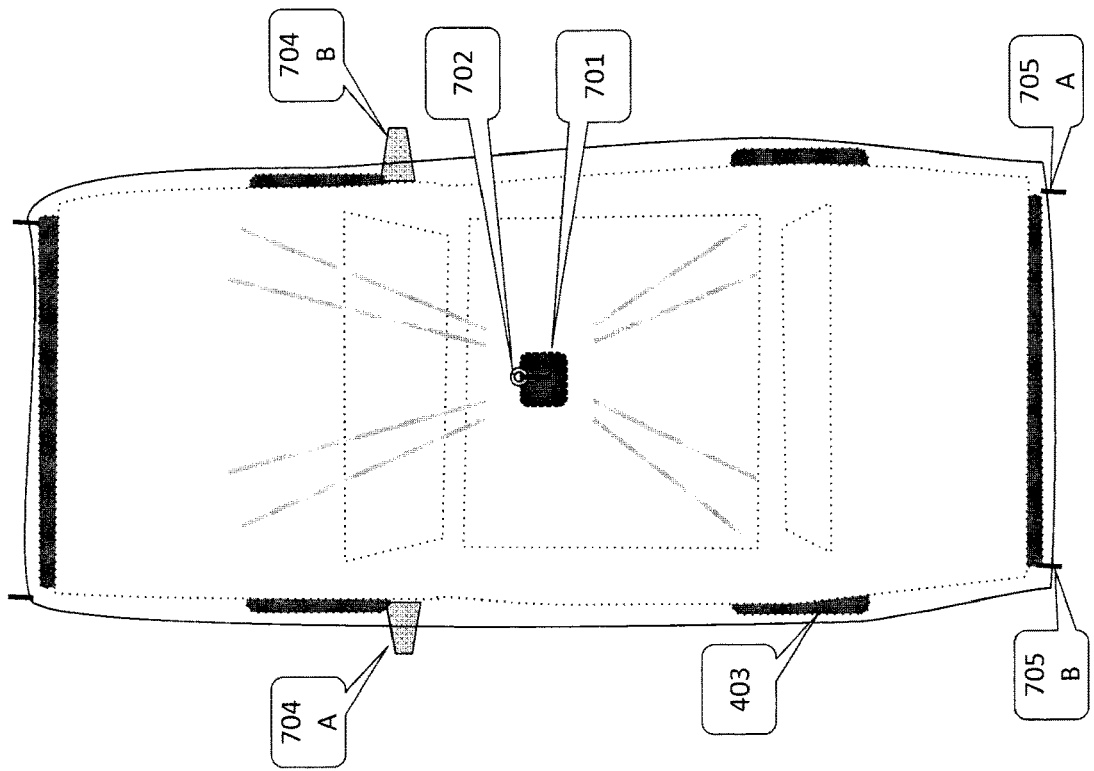

FIG. 7A illustrates a top view of a vehicle cover in the second or deployed position covering a vehicle in accordance with one embodiment. Patch 701 is coupled to the center region of the vehicle cover. Patch 701 can be made from a durable natural or synthetic material and may be similar to the material of the vehicle cover 107. Patch 701 provides reinforcement of the vehicle cover to enable the repeated lifting, moving and lowering of the vehicle cover by the center region of the vehicle cover. In some embodiments patch 701 is stitched onto vehicle cover 107. In other embodiments patch 701 is adhered to a surface of vehicle cover 107. Patch 701 could also include a loop to provide a means for a connector to couple the patch and vehicle cover 107 to a connector 702 or to a support line 108 as illustrated in FIGS. 7B and 7C. The connector 702 has a first end coupled to the patch 701 and a second end configured to attach to an apparatus coupler assembly 106. In one embodiment the connector 702 could include a hooked fastener with a spring release similar to the clips found in the manufacture of key chains and pet leashes on both the first and second ends. The desired characteristic of the connector is to provide a reliable, easily operated means for affixing a vehicle cover to the vehicle covering apparatus. A first pocket 704A extends from a first side of the vehicle cover and a second pocket 704B extends from a second side of the vehicle cover. The first and second pockets 704A and B could be placed over the vehicle side mirrors. Pockets 704A and B may include visual markings and the visual marking for the first pocket may be different than the visual marking for the second pocket in some embodiments. The visual markings could be different colors for the first and second pockets, respectively. The different visual markings assist in the orientation and placement of the vehicle cover when the vehicle cover is placed over the vehicle. It should be appreciated that the pockets 704A and B are optional and covers meant for other non-vehicle structures may or may not include pockets accommodating shapes of the non-vehicle structures, depending on the shape of the non-vehicle structure.

In addition, in one embodiment a first hook 705A having a visual marking matching the visual marking for the first pocket 704A. The first hook 705A is affixed to an edge of the vehicle cover 107 adjacent to a side of the cover having the first pocket 714A and a second hook 705B having a visual marking, matching the visual marking for the second pocket 704B. The second hook 705B is affixed to an edge of the vehicle cover 107 adjacent to a side of the cover having the second pocket 704B. In some embodiments, a first cover securing device may be affixed at a bottom edge of the vehicle cover. For example, an elastic material may be incorporated into portions of the bottom edge of the vehicle cover. The first cover securing device is operable to resist lifting of the vehicle cover when the vehicle cover is in the second position. The elastic material prevents the wind from lifting the cover when the cover is disposed on the vehicle. It should be appreciated that the elastic material is operable to resist lifting of the vehicle cover when the vehicle cover is in the second position. However, the resistance is such that the resistance can be overcome when lifting the vehicle cover 107 off of the vehicle to secure the cover in the first position. A second cover securing device 403 may be affixed to the cover and configured to secure the cover to an upright member when the cover is in the first position in some embodiments as described above.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A vehicle cover comprising:
   a patch coupled to a center region of the cover;
   a connector having a first end coupled to the patch, and a second end configured to attach to a vehicle covering apparatus operable to move the vehicle cover between a first and a second position;
   a first pocket extending from a first side of the cover; and
   a second pocket extending from a second side of the cover, wherein the first pocket and the second pocket are operable to accommodate a feature extending from a vehicle to be covered, and wherein the first pocket and the second pocket include visual markings, the visual marking for the first pocket is different than the visual marking for the second pocket; and
   a support line configured to be coupled to the cover, through a loop support configured to couple to the vehicle covering apparatus, wherein the support line is operable to position the cover between the first position with a portion of the cover passing through the loop support for storage of the cover, and the second position with the cover deployed.

2. The vehicle cover of claim 1, further comprising:
   a first cover securing device disposed along a bottom edge of the vehicle cover, the first cover securing device operable to resist lifting of the vehicle cover when the vehicle cover is in the second position.

3. The vehicle cover of claim 2, wherein the first securing device is an elastic material disposed along the bottom edge.

4. The vehicle cover of claim 3, further comprising:
   a second cover securing device affixed to a surface of the vehicle cover, the second cover securing device configured to secure the vehicle cover to the vehicle cover apparatus when the vehicle cover is in the first position.

* * * * *